United States Patent

Brown

[11] Patent Number: 5,867,005
[45] Date of Patent: Feb. 2, 1999

[54] AC MOTOR WINDING CIRCUIT

[75] Inventor: Fred A. Brown, Coronado, Calif.

[73] Assignee: Comair Rotron, Inc., San Ysidro, Calif.

[21] Appl. No.: 993,266

[22] Filed: Dec. 18, 1997

[51] Int. Cl.$^6$ ........................................... H02P 1/44
[52] U.S. Cl. ........................ 318/751; 318/82; 318/754; 318/774; 318/817; 318/772; 318/748; 318/776
[58] Field of Search ................. 318/82, 751, 754, 318/774, 817, 772, 748, 776

[56] References Cited

U.S. PATENT DOCUMENTS

| | | | |
|---|---|---|---|
| 2,454,136 | 11/1948 | Carville | 318/224 |
| 2,728,038 | 12/1955 | Koch | 318/82 |
| 2,813,239 | 11/1957 | La Cour | 318/221 |
| 2,896,144 | 7/1959 | Mollenberg | 318/224 |
| 3,853,174 | 12/1974 | Kramer | 165/39 |
| 3,875,483 | 4/1975 | Farr | 318/751 X |
| 4,103,212 | 7/1978 | Spradling | 318/224 |
| 4,110,670 | 8/1978 | Araki et al. | 318/212 |
| 4,132,932 | 1/1979 | Wanlass | 318/795 |
| 4,241,607 | 12/1980 | Maggia | 3/495 |
| 4,322,665 | 3/1982 | Landgraf | 318/774 |
| 4,463,302 | 7/1984 | Kirschbaum | 318/754 |
| 4,465,962 | 8/1984 | Kirschbaum | 318/817 |
| 4,737,701 | 4/1988 | Hoemann et al. | 318/772 |
| 4,748,355 | 5/1988 | Anderson et al. | 310/71 |
| 4,808,868 | 2/1989 | Roberts | 310/68 |
| 4,959,573 | 9/1990 | Roberts | 310/68 |
| 5,077,512 | 12/1991 | Weber | 318/776 |
| 5,136,216 | 8/1992 | Wills et al. | 318/123 |
| 5,218,283 | 6/1993 | Will et al. | 318/748 |
| 5,276,392 | 1/1994 | Beckerman | 318/751 |

*Primary Examiner*—Karen Masih
*Attorney, Agent, or Firm*—Bromberg & Sunstein LLP

[57] ABSTRACT

A winding circuit for use with different input signals includes a first main winding, a second main winding, and an auxiliary branch having an auxiliary winding permanently and serially connected to a capacitor. The windings and auxiliary branch are alternatively configurable in one of a first configuration or a second configuration for use with respective first and second input voltages. When in the first configuration, the first main winding, the second main winding, and the auxiliary branch are connected in parallel. The input voltage signal then may be applied across the first main winding. When in the second configuration, the first and second main windings are serially connected, and the auxiliary branch is connected in parallel with one of the first and second main windings. The input voltage signal then may be applied across the first main winding and the second main winding. The winding circuit includes a switch connected to the main windings to alternatively switch between the first configuration and the second configuration.

40 Claims, 3 Drawing Sheets

# AC MOTOR WINDING CIRCUIT

FIELD OF THE INVENTION

This invention generally relates to AC motors and, more particularly, this invention relates to winding circuits within AC motors.

BACKGROUND OF THE INVENTION

Alternating current motors ("AC motors") typically are designed (i.e., "rated") for use with specified input voltage signals. For example, AC motors built for use in the United States ("United States motors") typically are designed for use with a 115 volt AC signal. In a similar manner, AC motors built for use in many parts of Europe typically are designed for use with a 230 volt AC signal.

Voltage convertors may be used with AC motors to convert an input voltage signal from a non-rated form into a rated form. For example, a United States motor may be used in parts of Europe if a power converter converts the input voltage signal received by each motor winding from 230 volts AC into 115 volts AC. In addition to increasing product costs, however, use of a voltage converter is inconvenient and inefficient.

Accordingly, it would be advantageous to have a motor that is rated for use with two or more input voltage signals.

SUMMARY OF THE INVENTION

In accordance with one aspect of the invention, a winding circuit within an AC motor may be switched between first and second configurations to facilitate normal motor operation at respective first and second input voltages. For example, an AC motor may operate at an input voltage of about 115 volts AC when in the first configuration, and then, when necessary, may be switched to the second configuration to operate at an input voltage of about 230 volt AC. Accordingly, there is no need for a power converter to convert the input voltage signal.

To that end, the winding circuit preferably includes a first main winding, a second main winding, and an auxiliary branch having an auxiliary winding permanently and serially connected to a capacitor. The windings and auxiliary branch are alternatively configurable in one of a first configuration or a second configuration for use with respective first and second input voltages. When in the first configuration, the first main winding, the second main winding, and the auxiliary branch are connected in parallel. The input voltage signal then may be applied across the first main winding. When in the second configuration, the first and second main windings are serially connected, and the auxiliary branch is connected in parallel with one of the first and second main windings. The input voltage signal then may be applied across the serial combination of the first main winding and the second main winding. In preferred embodiments, the winding circuit includes a switch connected to the main windings to alternatively switch between the first configuration and the second configuration. The first and second configurations preferably are adapted for use with respective first and second input voltages, where the amplitude of the second input signal is about twice as large as that of the first input signal.

In accordance with another aspect of the invention, a method of arranging circuit elements in an AC motor winding circuit (i.e., first main winding, second main winding, and auxiliary branch) produces substantially identical motor operation at first and second input voltages. To that end, it first is determined which one of the first and second input voltages is to be used by the winding circuit. If the input voltage is determined to be the first input voltage, then the first main winding, second main winding, and the auxiliary branch are connected in parallel. If the input voltage is determined to be the second input voltage, then the first main winding and second main winding are connected in series, and the auxiliary portion is connected in parallel with one of the two main windings. In preferred embodiments, the motor is a two or four pole, permanent split capacitor motor.

In accordance with still another aspect of the invention, a kit for assembling a winding circuit in an AC motor facilitates motor use at two different input voltages. To that end, the kit comprises a first main winding having first and second end portions, where the first end portion has a first lead and the second end portion has a second lead. The kit further includes an auxiliary winding portion comprising a second main winding serially connected to a capacitor, and an auxiliary winding serially connected between the second main winding and the capacitor. The auxiliary winding portion also has a third lead connected to one end portion of one of the second main winding and the auxiliary winding, and a fourth lead connected to another end portion of the one of the second main winding and the auxiliary winding. Moreover, the kit includes instructions for alternatively connecting the winding circuit in either of a first configuration and a second configuration. When in the first configuration, the first lead is connected to the third lead, and the second lead is connected to the fourth lead. A voltage input port thus is provided across the first main winding. Alternatively, when in the second configuration, the first lead is connected to the third lead. A voltage input port thus is provided across the second lead and the fourth lead. The instructions may include visual indicia, such as printed matter or a video tape for use with a video cassette player. In addition, the capacitor may be permanently connected to the auxiliary winding by conventional soldering processes.

BRIEF DESCRIPTION OF THE DRAWINGS

The foregoing and other objects and advantages of the invention will be appreciated more fully from the following further description thereof with reference to the accompanying drawings wherein.

DESCRIPTION OF ILLUSTRATIVE EMBODIMENTS

Figure 1:
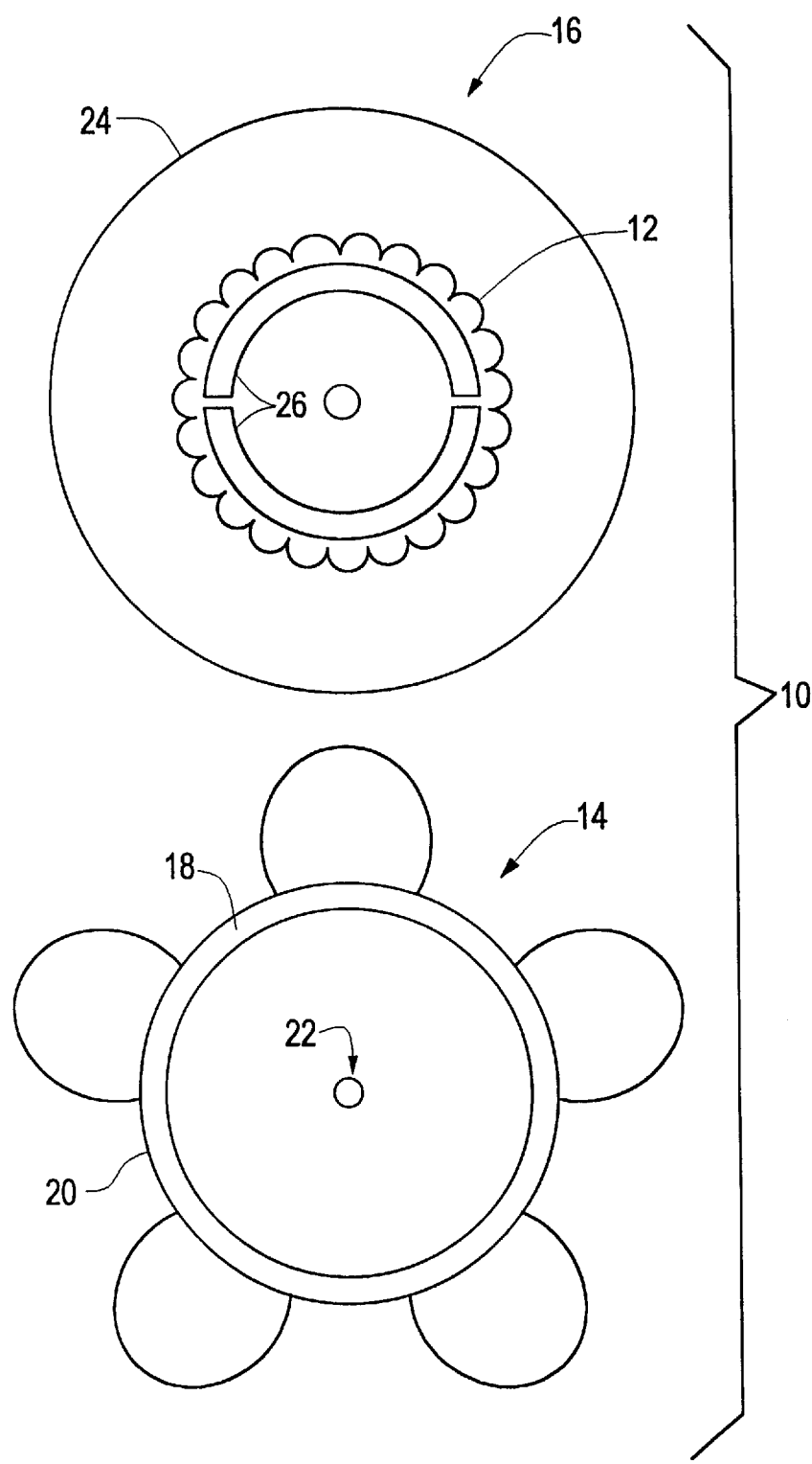
FIG. 1 schematically shows a partially exploded plan view of a two-pole, permanent split capacitor alternating current motor that may be used with a preferred embodiment of the invention.

FIG. 1 schematically shows a partially exploded plan view of a two-pole, permanent split capacitor alternating current motor (hereinafter "AC motor 10" or "motor 10") that may be used with a preferred embodiment of the invention. The motor 10 includes an internal winding circuit (identified as "winding circuit 12") that may be switched between first and second configurations to facilitate normal motor operation at respective first and second input voltages. It should be noted that although the term "connected" is used throughout this specification and in the claims, the term "coupled" also may be utilized since the connections between circuit elements do not necessarily have to be direct connections.

The motor 10 shown in FIG. 1 has a rotor 14, and a stator 16 for rotating the rotor 14. The rotor 14 has annular permanent magnet 18 secured in a steel cup 20. A central shaft 22, which is secured to an end face of the cup 20, is received in bearings (not shown) in the stator 16 when the motor 10 is assembled. The stator 16 includes a stator housing 24 that contains the winding circuit 12, which is wrapped about two poles 26. Among other circuit elements (FIG. 2), the winding circuit 12 preferably includes windings, a capacitor, and a switch that together facilitate motor operation at two different input voltages.

Figure 2:
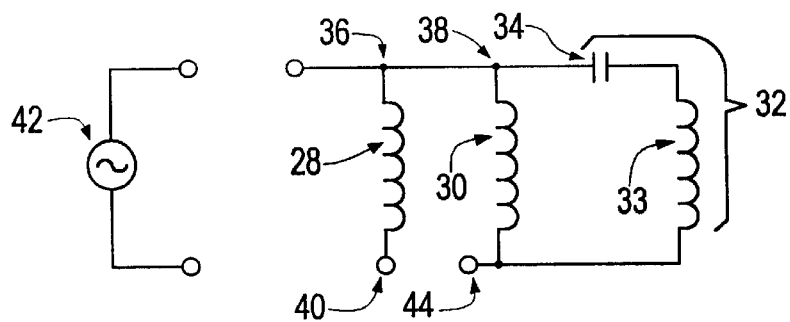
FIG. 2 schematically shows a motor winding circuit that may incorporate a preferred embodiment of the invention.

FIG. 2 schematically shows a motor winding circuit 12 that incorporates a preferred embodiment of the invention. More particularly, the winding circuit 12 includes a first main winding 28, a second main winding 30, and an auxiliary branch 32. In preferred embodiments, the auxiliary branch 32 includes a capacitor 34 serially and permanently connected to an auxiliary winding 33. Typical of split capacitor motors, the capacitor 34 phase shifts the input voltage signal to provide improved motor torque and performance. In preferred embodiments, the capacitor 34 is about six microfarads and rated at about 200 volts AC.

The second main winding 30 preferably is permanently connected in parallel with the auxiliary branch 32 to form an auxiliary winding portion of the winding circuit 12. Moreover, the first main winding 28 preferably has a first end 36 that is permanently connected to a first end 38 of the second main winding 30, and a second end 40 that may be detachably connected to either an AC input power source 42, or to a second end 44 of the second main winding 30. Each of the circuit elements in the winding circuit 12 (which are two terminal devices) may include leads at each terminal (i.e., at each end of the circuit elements).

Conventional soldering processes may be used to permanently connect the leads of the elements that are permanently connected. It should be noted, however, that any known process of permanently connecting the leads may be utilized. Leads should be considered to be permanently connected when a material has been melted and hardened to secure two leads together. The material that is melted may be any known material such as, for example, the metal in the leads themselves, or soldering material.

As noted above, certain circuit elements are considered to be "detachably connected" or "detachably connectible" to other circuit elements. When designated as such, the leads may be manually detached from other leads without breaking or removing a material bond or otherwise requiring a forceful detachment. For example, two detachably connected leads may be twisted together and secured with a conventional wire nut, wire splicer, or other detachable wire connector.

The second end 40 of the first main winding 28 therefore may be considered to be detachably connectable to the second end 44 of the second main winding 30. Because of this detachable connection, the winding circuit 12 may be configured in first and second configurations that each may be used with respective first and second input voltage signals.

When in the first configuration, the second end 40 of the first main winding 28 is detachably connected to the second end 44 of the second main winding 30. This (first) configuration therefore produces an input port across the first main winding 28. Accordingly, since the main windings 28 and 30 and auxiliary branch 32 are in parallel, the auxiliary branch 32 and windings 28 and 30 receive the entire input voltage. Conversely, when in the second configuration, the second end 40 of the first main winding 28 is connectible to a port of a power source 42. Accordingly, the input port in the second configuration is across the first and second main windings 28 and 30. More specifically, a first terminal of the input power source 42 is detachably connectable to the second end 40 of the first main winding 28, and a second terminal of the power source 42 is connectable to the second end 44 of the second main winding 30. This connection creates a voltage division, effectively dividing the input voltage in half across each of the first main winding 28, second main winding 30, and auxiliary branch 32.

When the first configuration is used with 115 volts AC, for example, the first main winding 28, second main winding 30, and auxiliary branch 32 each receive approximately 115 volts AC. A motor 10 incorporating the winding circuit 12 thus may be used in most of Europe (which uses 230 volts AC) by reconfiguring it to the second configuration. When in the second configuration and used in Europe, the noted voltage division divides the 230 volts to enable the first main winding 28, second main winding 30, and auxiliary branch 32 to receive approximately 115 volts AC. Moreover, the capacitor 34 may be rated relatively low (below 230 volts AC) in such case since it should not receive the full 230 volts AC. Accordingly, unlike prior art winding circuits that would require either a large capacitor for the higher volt signal and a smaller capacitor for the lower volt signal, a single, small internal capacitor having a small profile may be utilized within the stator housing 24. This should decrease the part cost of the capacitor 34 by more than half, thus lowering the overall manufacturing cost of the split capacitor motor 10.

Accordingly, by switching to the second configuration, a motor 10 rated for operation at a specified input voltage (e.g., 115 volts AC) may be used with another input voltage that is approximately two times the specified (rated) voltage (e.g., 230 volts AC). It should be noted that although 115 volts AC and 230 volts AC are discussed, such values are used merely for exemplary purposes and are not intended to limit the invention.

In alternative embodiments, additional auxiliary branches may be permanently connected in parallel with the auxiliary branch 32. In a similar manner, the winding circuit 12 may be adapted to operate with multi-phase motors having four or more poles.

Figure 3:
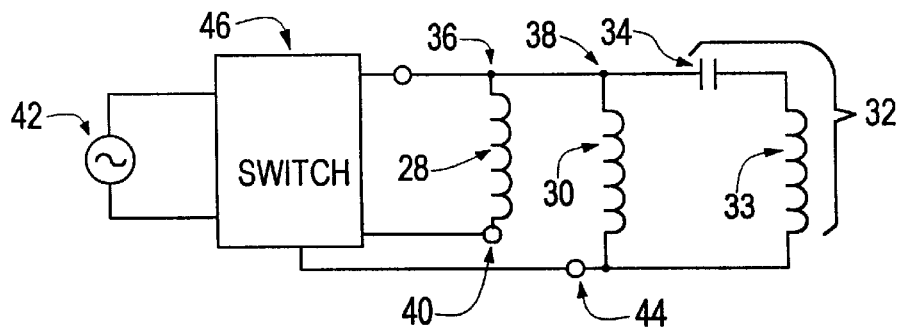
FIG. 3 schematically shows another embodiment of the motor winding circuit incorporating a switch.

FIG. 3 schematically shows another embodiment of the motor winding circuit 12 incorporating a switch 46 that may be utilized to switch the winding circuit 12 between the first and second configurations. In a manner similar to the embodiment shown in FIG. 2, the winding circuit 12 may be manually switched between the two configurations once the input voltage is determined. The switch 46 has ports for receiving the first and second ends 36 and 40 of the first main winding 28, and the second end 44 of the second main winding 30. In addition, the switch 46 also has ports for receiving the two ports of the power source 42. The switch 46 may be any conventional switch adapted for such purposes. For example, a series SE dual voltage switch, available from ITW Switches of Norwood Heights, Ill., may be utilized.

Figure 4:
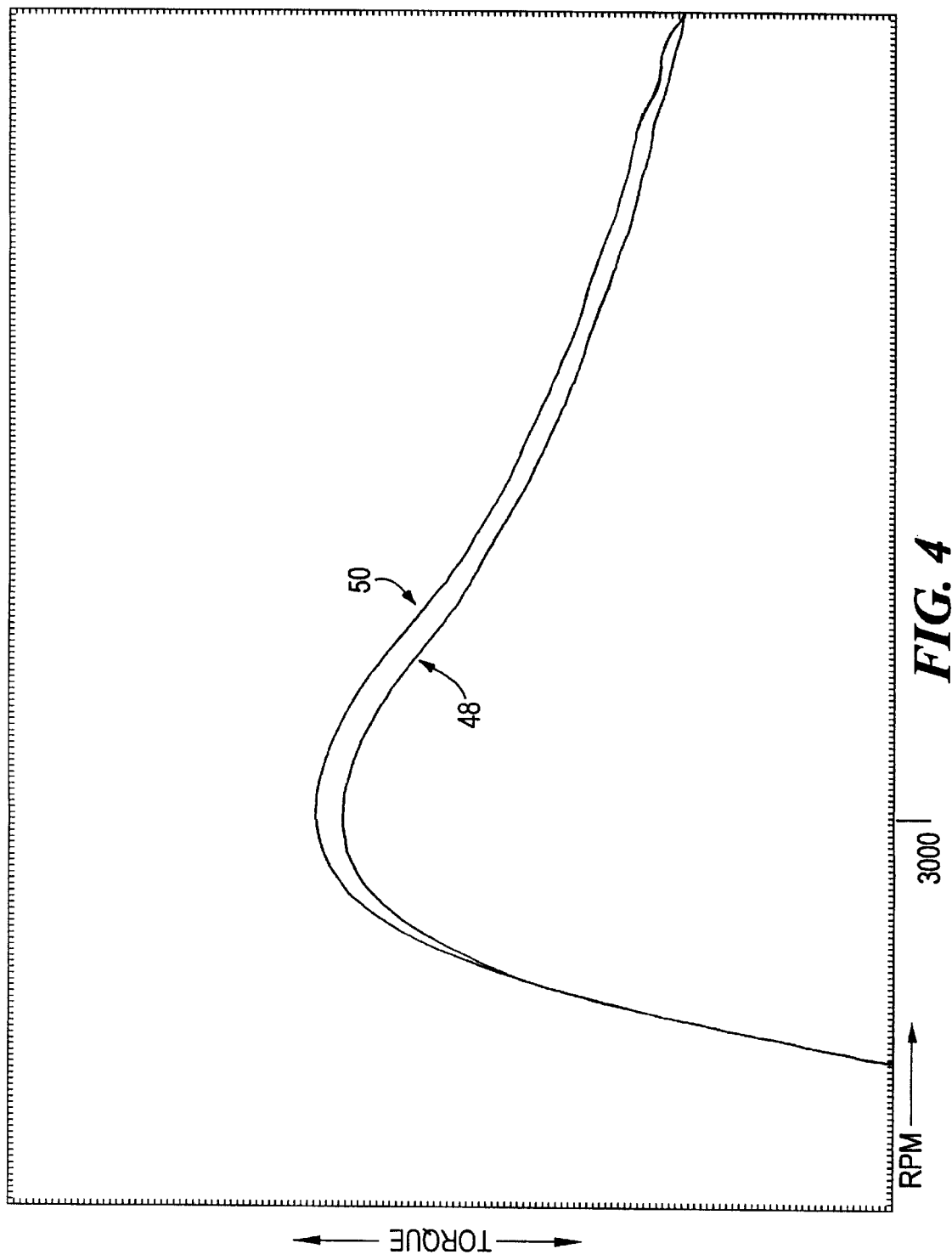
FIG. 4 shows a graphical representation of the performance of the motor winding circuit.

FIG. 4 shows a graphical representation of the performance of a test motor winding circuit incorporating a preferred embodiment of the invention. The test winding circuit was a two-pole, split capacitor motor 10 with a first main winding having an impedance of about 182 ohms, a second main winding having an impedance of about 178 ohms, an auxiliary winding having an impedance of about 170 ohms, and a four micro-henry capacitor rated at 200 volts AC. The graph shows revolutions per minute ("RPM") as a function of torque of the test winding circuit in the first configuration 48 and in the second configuration 50. Both configurations had a peak torque of about 16–18 ounce-inches at an RPM at about 3,000 and, as shown, operated substantially identically.

Figure 5:
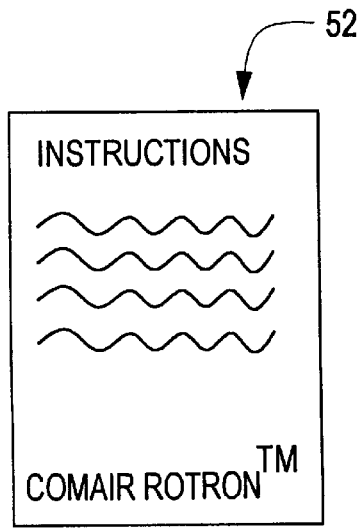
FIG. 5 shows printed instructions that may be utilized with an alternative embodiment of the invention.

In another alternative embodiment, the motor winding circuit 12 may be a kit of circuit elements and instructions 52 (FIG. 5) detailing the proper use of the motor 10. The kit may include an auxiliary winding portion, which includes the auxiliary branch 32 permanently connected in parallel with the second main winding 30, the first main winding 28 (not connected to the auxiliary portion), and the switch 46. Alternatively, each of the circuit elements, including the capacitor 34, may be not connected to other elements and thus, require permanent and detachable connections to other circuit elements as shown in the instructions 52. Such embodiment may include a soldering apparatus for providing the permanent connections. The instructions 52 may include visual indicia showing a user how to connect the circuit elements into either of the first configuration or the second configuration. Such instructions 52 may be printed on any known medium such as, for example, paper, or on a readily viewable portion of the stator housing 24 in a medium that is permanently connected to the housing. In alternative embodiments, the instructions 52 may be on a video tape, a DVD disk, CD ROM, or other known medium.

In alternative embodiments, the motor winding circuit 12 may be permanently connected in either one of the two noted configurations and thus, not be alternatively configurable. Such embodiment is especially useful since a single winding circuit 12 may be distributed to different users who can permanently configure the circuit in a specified configuration. This enables a distributor to stock one type of motor (i.e., one that is dually configurable as discussed herein) that may be used for two or more input voltage signals.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

I claim:

1. A winding circuit within an AC motor, the winding circuit comprising:
   a first main winding;
   a second main winding;
   an auxiliary branch comprising an auxiliary winding permanently and serially connected to a capacitor;
   the windings and auxiliary branch being alternatively configurable in one of a first configuration and a second configuration,
   the first configuration having the first main winding, second main winding, and auxiliary branch connected in parallel;
   the second configuration having the first and second main windings serially connected, and the auxiliary branch connected in parallel with one of the first and second main windings.

2. The winding circuit as defined by claim 1 wherein the motor includes two poles.

3. The winding circuit as defined by claim 1 wherein the winding circuit includes an input, the input being across the first main winding in the first configuration.

4. The winding circuit as defined by claim 1 wherein the winding circuit includes an input, the input being across the first main winding and the second main winding in the second configuration.

5. The winding circuit as defined by claim 1 further including a switch to switch the circuit between the first configuration and the second configuration.

6. The winding circuit as defined by claim 1 wherein the motor is a permanent split capacitor motor.

7. The winding circuit as defined by claim 1 wherein the auxiliary winding electrically is ninety degrees out of phase with the main windings.

8. The winding circuit as defined by claim 1 further including written instructions for configuring the winding circuit in the first and second configurations.

9. In an AC motor, a method of arranging circuit elements in a motor winding circuit comprising a first main winding, a second main winding, and an auxiliary branch having an auxiliary winding serially connected to a capacitor, the method producing substantially identical motor operation at first and second input voltages, the method comprising the steps of:
   A. determining which one of the first and second input voltages is to be used by the motor winding circuit;
   B. if the input voltage is determined to be the first input voltage, connecting the first main winding, second main winding, and the auxiliary branch in parallel; and
   C. if the input voltage is determined to be the second input voltage, then first connecting the first main winding in series with the second main winding, and then connecting the auxiliary branch in parallel with one of the two main windings.

10. The method as defined by claim 9 wherein the motor is a two-pole motor.

11. The method as defined by claim 9 wherein the capacitor is permanently connected to the auxiliary winding.

12. The method as defined by claim 9 further including the step of:
   D. providing a switch to connect the windings between the configuration in step B and the configuration in step C.

13. The method as defined by claim 9 wherein the first voltage is about 115 volts AC, and the second voltage is about 230 volts AC.

14. The method as defined by claim 9 wherein the second input voltage is about twice as large as the first input voltage.

15. The method as defined by claim 9 wherein the motor is a permanent split capacitor motor.

16. The method as defined by claim 9 further including the step of:
   F. applying the first input voltage across the first main winding if the input voltage is determined to be the first input voltage.

17. The method as defined by claim 9 further including the step of:
   G. applying the second input voltage across the series combination of the first main winding and the second main winding if the input voltage is determined to be the second input voltage.

18. A winding circuit within an AC motor for substantially identical operation at predetermined first and second input voltages, the winding circuit comprising:

a first main winding, a second main winding, and an auxiliary branch having an auxiliary winding serially connected to a capacitor;

means for connecting the first main winding, the second main winding, and the auxiliary branch in parallel to produce a first configuration, the first configuration adapted for use when the input voltage is the first input voltage; and means for connecting the first main winding in series with the second main winding, and means for connecting the auxiliary branch in parallel with one of the two main windings to produce a second configuration, the second configuration adapted for use when the input voltage is the second input voltage.

19. The winding circuit as defined by claim 18 wherein the motor includes two poles.

20. The winding circuit as defined by claim 18 wherein the capacitor is permanently connected to the auxiliary winding.

21. The winding circuit as defined by claim 18 further including:
a switch to connect the windings between the first configuration and the second configuration.

22. The winding circuit as defined by claim 18 wherein the first voltage is about 115 volts AC, and the second voltage is about 230 volts AC.

23. The winding circuit as defined by claim 18 wherein the second input voltage is about twice as large as the first input voltage.

24. The winding circuit as defined by claim 18 wherein the motor is a permanent split capacitor motor.

25. The winding circuit as defined by claim 18 further including:
means for applying the first input voltage across the first main winding when the windings are connected in the first configuration.

26. The winding circuit as defined by claim 18 further including:
means for applying the second input voltage across the series combination of the first main winding and the second main winding when the windings are connected in the second configuration.

27. In an AC motor, an apparatus for arranging a first main winding, a second main winding, and an auxiliary branch, having an auxiliary winding serially connected to a capacitor, of a motor winding circuit for substantially identical operation at first and second predetermined input voltages, the apparatus comprising:

means for connecting the first main winding, the second main winding, and the auxiliary branch in parallel to produce a first configuration, the first configuration adapted for use when the input voltage is the first input voltage; and means for connecting the first main winding in series with the second main winding, and means for connecting the auxiliary branch in parallel with one of the two main windings to produce a second configuration, the second configuration adapted for use when the input voltage is the second input voltage.

28. The apparatus as defined by claim 27 wherein the capacitor is permanently connected to the auxiliary winding.

29. The apparatus as defined by claim 27 further including:
a switch to connect the windings between the first configuration and the second configuration.

30. The apparatus as defined by claim 27 wherein the second input voltage is about twice as large as the first input voltage.

31. The apparatus as defined by claim 27 further including:
means for applying the first input voltage across the first main winding when the windings are connected in the first configuration.

32. The apparatus as defined by claim 27 further including:
means for applying the second input voltage across the series combination of the first main winding and the second main winding when the windings are connected in the second configuration.

33. A kit for assembling a winding circuit in an AC motor, the kit comprising:

a first main winding having first and second end portions, the first end portion having a first lead, the second end portion having a second lead;

an auxiliary winding portion comprising a second main winding serially connected to a capacitor, and an auxiliary winding serially connected between the second main winding and the capacitor;

the auxiliary winding portion having a third lead connected to one end portion of one of the second main winding and the auxiliary winding, the auxiliary winding portion also having a fourth lead connected to another end portion of the one of the second main winding and the auxiliary winding;

instructions for alternatively connecting the winding circuit in either of a first configuration and a second configuration, the first configuration connecting the first lead to the third lead, and connecting the second lead to the fourth lead, the first configuration having an input across the first main winding;

the second configuration connecting the first lead to the third lead and having an input across the second lead and the fourth lead.

34. The kit as defined by claim 33 wherein the capacitor is permanently connected to the auxiliary winding.

35. The kit as defined by claim 34 wherein the elements in the auxiliary winding portion are soldered together.

36. The kit as defined by claim 33 wherein the instructions comprise visual indicia.

37. A winding circuit within an AC motor, the winding circuit comprising:

an auxiliary winding portion comprising a first winding serially connected to a capacitor, and a second winding serially connected between the first winding and the capacitor, the first winding, second winding, and capacitor being permanently connected, the first winding having first and second ends;

a third winding having a first end permanently connected to the first end of the first winding and a second end that is detachably connectible to the second end of the first winding.

38. The winding circuit as defined by claim 37 wherein the permanent connections in the winding circuit are soldered together.

39. The winding circuit as defined by claim 37 wherein the circuit is configurable in a first configuration and a second configuration, the first configuration having an input port across the third winding, and the second configuration having an input port across the second end of the third winding and the second end of the first winding.

40. The winding circuit as defined by claim 37 further including a switch connected to the third winding to switch between the first configuration and the second configuration.

* * * * *